(12) United States Patent
Grosse

(10) Patent No.: US 8,776,237 B2
(45) Date of Patent: Jul. 8, 2014

(54) METHOD AND APPARATUS FOR END-TO-END SECURITY IN A HETEROGENEOUS NETWORK

(75) Inventor: Eric H. Grosse, Berkeley Heights, NJ (US)

(73) Assignee: Alcatel Lucent, Paris (FR)

( * ) Notice: Subject to any disclaimer, the term of this patent is extended or adjusted under 35 U.S.C. 154(b) by 2616 days.

(21) Appl. No.: 11/356,721

(22) Filed: Feb. 17, 2006

(65) Prior Publication Data

US 2007/0198826 A1  Aug. 23, 2007

(51) Int. Cl.
*G06F 21/00*    (2013.01)
(52) U.S. Cl.
USPC ......... 726/25; 726/4; 726/12; 726/14; 726/27
(58) Field of Classification Search
USPC ....... 713/151, 153; 455/410; 370/238; 726/4, 726/12, 14, 27; 380/258
See application file for complete search history.

(56) References Cited

U.S. PATENT DOCUMENTS

| 6,895,091 | B1* | 5/2005 | Elliott et al. | 380/278 |
| 7,076,650 | B1* | 7/2006 | Sonnenberg | 713/151 |
| 7,376,087 | B2* | 5/2008 | Srikrishna | 370/238 |
| 2005/0239438 | A1* | 10/2005 | Naghian | 455/410 |

* cited by examiner

*Primary Examiner* — Jeffrey Pwu
*Assistant Examiner* — Helai Salehi
(74) *Attorney, Agent, or Firm* — Ryan, Mason & Lewis, LLP

(57) ABSTRACT

Methods and apparatus are provided for end-to-end security in heterogeneous networks. Hop-by-hop protection techniques ensure that each hop of a signaling path is satisfying one or more predefined security criteria. An end-to-end path is secured at each node by identifying a next hop in the end-to-end path; determining, in response to a received call setup request, if a vendor associated with the next hop in the end-to-end path has satisfied one or more predefined security criteria; and routing the call to the next hop if the vendor has satisfied the one or more predefined criteria. A look-up table can be used to determine whether a vendor has satisfied the one or more predefined security criteria. The look-up table can identify one or more of: (i) vendors that have achieved a predefined security rating; (ii) members in a predefined consortium or business group; and (iii) signatories to a predefined contract or technical specification.

20 Claims, 3 Drawing Sheets

US 8,776,237 B2

METHOD AND APPARATUS FOR END-TO-END SECURITY IN A HETEROGENEOUS NETWORK

FIELD OF THE INVENTION

The present invention relates to the network security techniques and, more particularly, to methods and apparatus for ensuring end-to-end security in heterogeneous networks.

BACKGROUND OF THE INVENTION

The Internet Protocol (IP) Multimedia Subsystem (IMS) provides for access-independent advanced multimedia services in a distributed architecture. The session control mechanism of IMS is based on the Session Initiation Protocol (SIP) and provides a flexible, distributed network architecture for deployment of advanced consumer and business services. It is believed that IMS will be the leading technology for delivering evolving Voice over IP (VoIP) services.

It has been recognized that IMS service providers must deploy secure reliable services in order to attract and retain customers. Since IMS supports VoIP services, IMS must address confidentiality of conversations, integrity of communications, end user privacy and the availability of the advanced services that IMS can deliver. Some key security requirements for service providers include hardened network elements and management systems, peer entity and data origin authentication, message integrity, confidentiality, privacy of end user identification, scalable key management, and standards compliance. In many cases, message authentication and integrity will be more important than confidentiality in order to protect the network from fraud and denial of service (DoS) attacks.

The IMS security standards are driven by the $3^{rd}$ Generation Partnership Project (3GPP) and the $3^{rd}$ Generation Partnership Project 2 (3GPP2). See, e.g., 3GPP TS 33.203 v5.8.0, "Access Security for IP-Based Services," Release 5; and 3GPP TS 33.210 v5.5.0, "Network Domain Security; IP Network Layer Security," Release 5, each incorporated by reference herein. Through such technical specifications, these bodies define and specify how an IMS system is to operate and behave.

Access security is typically concerned with mutual authentication of the user and network equipment and securing the first hop signaling. Securing the first hop may be achieved, for example, through the Secure SIP (SIPS) protocol. Currently, users wishing a secure end-to-end communications path must use either end-to-end cryptographic protection, which may be difficult or expensive to achieve in some situations, or request hop-by-hop protection with the hope that each intermediary node makes the same request to each subsequent node.

A significant problem with hop-by-hop protection, however, is the difficulty in knowing at one endpoint how well the protection extends to the far endpoint. Existing standards provide a mechanism for indicating that each hop of the signaling path is supposed to use Transport Layer Security (TLS) or the call should not be admitted. For example, a call setup request may employ the prefix "sips" (Secure SIP) when identifying the called party, as an indication that hop-by-hop protection is desired to the called party. This allows the user to declare and observe the security level. In a world of possibly untrusted SIP proxies along the end-to-end path, vendors that fail to fully and correctly implement the standard, or the use of unauthenticated TLS, such a mechanism may not provide adequate assurance.

A need therefore exists for improved methods and apparatus for end-to-end security in heterogeneous networks. A further need exists for hop-by-hop protection techniques that ensure that each hop of a signaling path is satisfying one or more predefined security criteria.

SUMMARY OF THE INVENTION

Generally, methods and apparatus are provided for end-to-end security in heterogeneous networks. According to one aspect of the invention, hop-by-hop protection techniques ensure that each hop of a signaling path is satisfying one or more predefined security criteria. An end-to-end path is secured at each node by identifying a next hop in the end-to-end path; determining, in response to a received call setup request, if a vendor associated with the next hop in the end-to-end path has satisfied one or more predefined security criteria; and routing the call to the next hop if the vendor has satisfied the one or more predefined criteria.

A look-up table can optionally be used to determine if a vendor has satisfied the one or more predefined security criteria. The look-up table can identify one or more of: (i) vendors that have achieved a predefined security rating; (ii) members in a predefined consortium or business group; and (iii) signatories to a predefined contract or technical specification.

In one implementation, the call is routed to the next hop only if the vendor has satisfied the one or more predefined criteria. In a further variation, the call is routed even if the next hop has not satisfied the one or more predefined criteria, but an indication of a compromised security is signaled to a caller associated with the call.

A more complete understanding of the present invention, as well as further features and advantages of the present invention, will be obtained by reference to the following detailed description and drawings.

DETAILED DESCRIPTION

The present invention provides improved methods and apparatus for end-to-end security in a heterogeneous network. According to one aspect of the invention, hop-by-hop protection techniques are provided that ensure that each hop in an end-to-end path is satisfying one or more predefined security criteria. A given hop in an end-to-end path will not forward the call to a next hop, unless the next hop has satisfied the one or more predefined security criteria. The determination of whether the next hop satisfies the one or more predefined security criteria may be based on a predefined security rating of the vendor associated with the hop, membership of the vendor in a predefined consortium or business group, or being a signatory to a predefined contract or technical specification. It is noted that the techniques of the present invention can be employed to protect both the signaling and media information, as would be apparent to a person of ordinary skill in the art.

Figure 1:
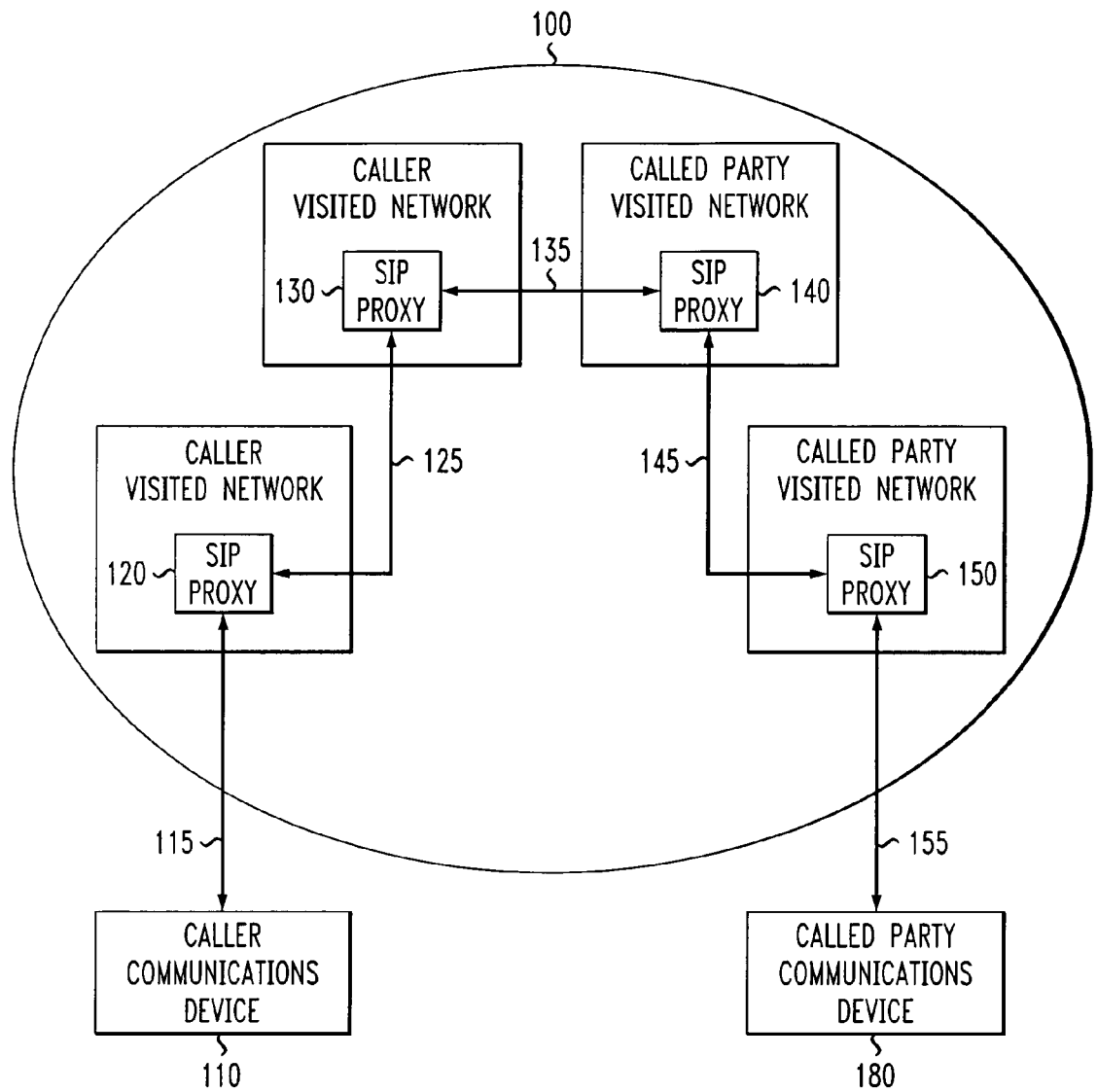
FIG. 1 illustrates an exemplary network environment in which the present invention can operate.

FIG. 1 illustrates an exemplary network environment 100 in which the present invention can operate. As shown in FIG. 1, a caller, employing a caller communications device 110, initiates a call to a called party, employing a called party communications device 180. Typically, the end-to-end path comprises a number of hops in a visited network and a home network of both the caller and the called party. In the exemplary network environment 100 shown in FIG. 1, the end-to-end path comprises one or more SIP proxies 120 in a caller visited network, one or more SIP proxies 130 in a caller home network, one or more SIP proxies 140 in a called party home network, and one or more SIP proxies 150 in a called party visited network. Of course, if either the caller or called party are in their home network environments at the time the call is placed, the corresponding visited network portions of the network environment 100 would not be present, as apparent to a person of ordinary skill.

For a more detailed discussion of call routing and call establishment techniques, see, for example, J. Rosenberg et al., "SIP: Session Initiation Protocol", RFC 3261, June 2002, incorporated by reference herein.

The caller can provide a request for hop-by-hop protection. For example, a call setup request may employ the prefix "sips" (Secure SIP) when identifying the called party, as an indication that hop-by-hop protection is desired to the called party. The caller communications device 110 can be authenticated to the first hop (the SIP proxy 120 in the caller visited network), for example, using the AKA protocol. This authentication can be performed, for example, in accordance with TLS using the call session control function (CSCF) of the SIP Proxy 120. See, e.g., 3GPP TS 33.902 Annex B, "Formal Analysis of 3G Authentication and Key Agreement Protocol," incorporated by reference herein.

As indicated above, the present invention provides hop-by-hop protection techniques to ensure that each hop in an end-to-end path is satisfying one or more predefined security criteria. As discussed below in conjunction with FIG. 3, a given hop in an end-to-end path will not forward the call to a next hop, unless the next hop has satisfied the one or more predefined security criteria.

Figure 2:
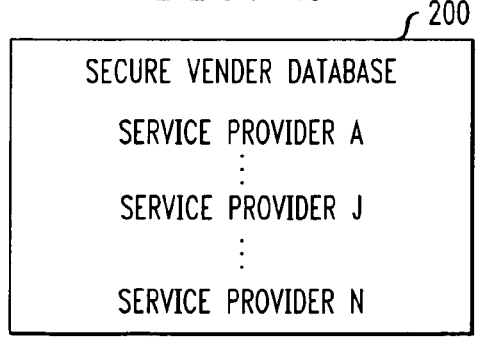
FIG. 2 is a sample table illustrating an exemplary secure vendor database incorporating features of the present invention.

FIG. 2 is a sample table illustrating an exemplary secure vendor database 200 incorporating features of the present invention. The secure vendor database 200 is accessed by each hop in an end-to-end path to determine if the next hop satisfies one or more predefined security criteria. The secure vendor database 200 may be stored locally by each SIP Proxy 120, 130, 140, 150, or may be stored centrally and accessed by each SIP Proxy 120, 130, 140, 150 using a network connection. Generally, the secure vendor database 200 identifies the vendors (i.e., service providers or carriers) associated with the SIP Proxies that satisfy the predefined security criteria. In this manner, the secure vendor database 200 provides a look-up table that allows a given hop in an end-to-end path to determine if the next hop satisfies the predefined security criteria.

The secure vendor database 200 may be populated, for example, with a list of vendors that have achieved a predefined security rating, are members in a predefined consortium or business group, or are signatories to a predefined contract or technical specification. In this manner, the secure vendor database 200 identifies a subset of the full network environment 100 that can reliably carry the transitive trust. A secure path is created in accordance with the present invention if and only if the path remains within the trusted subset.

As shown in FIG. 2, in the exemplary embodiment of FIG. 2, the secure vendor database 200 is populated with a list of vendors that have satisfied predefined security criteria. Thus, a vendor listed in the exemplary secure vendor database 200 is automatically pre-approved to carry each call. In a further variation, the secure vendor database 200 may provide a security rating for each listed vendor and a given vendor may only be qualified to carry a given call if the vendor's listed security rating satisfies the indicated security requirements for the given call.

Figure 3:
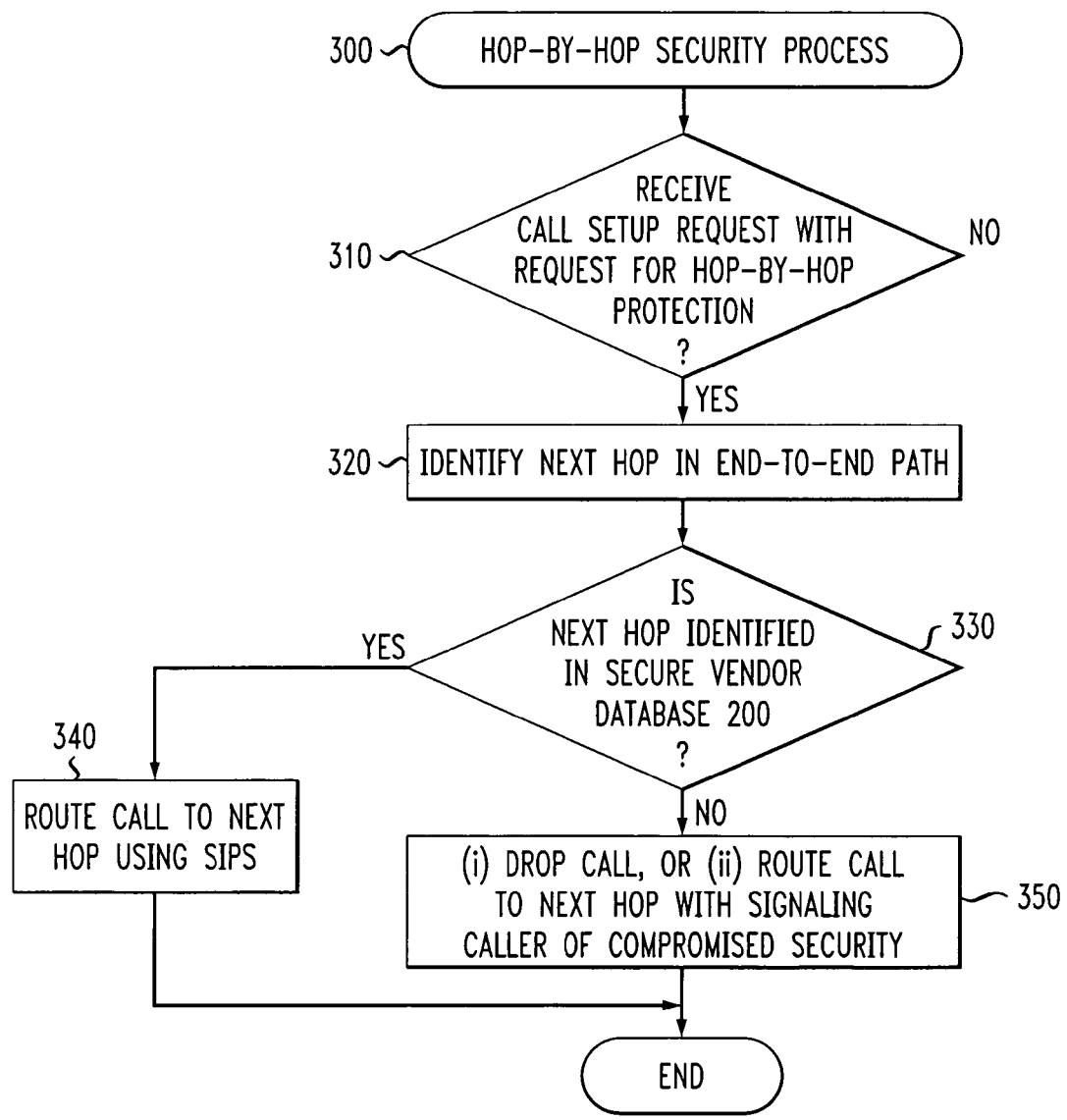
FIG. 3 is a flow chart describing an exemplary hop-by-hop security process incorporating features of the present invention.

FIG. 3 is a flow chart describing an exemplary hop-by-hop security process 300 incorporating features of the present invention. As shown in FIG. 3, the exemplary hop-by-hop security process 300 is initiated during step 310 upon receipt of a call setup request containing a request for hop-by-hop protection. Upon receipt of a call setup request containing a request for hop-by-hop protection, the hop-by-hop security process 300 identifies one or more potential next hop(s) during step 320 in the end-to-end path between the caller and the called party identified in the request. The vendor associated with the next hop may be identified, for example, by accessing a Domain Name Server (DNS).

A test is performed during step 330 to determine if the next hop is identified in the secure vendor database 200. If it is determined during step 330 that the next hop is identified in the secure vendor database 200, then the call is routed to the next hop during step 340 using SIPS. It is noted that upon receipt of the call, the next hop (and each subsequent hop) will itself implement the hop-by-hop security process 300 to maintain the security in the end-to-end path.

If, however, it is determined during step 330 that the next hop is not identified in the secure vendor database 200, then the call (i) can be dropped, or (ii) routed to the next hop, along with signaling back to the caller indicating the compromised security during step 350. In this manner, the exemplary embodiment provides a "best effort, but no promises" level of security when the desired hop-by-hop security cannot be ensured.

It is noted that under existing network security standards, the final hop need not be performed in accordance with SIPS. In other words, the final hop is allowed to have sufficient security to satisfy the called party. In addition, if the next hop is a SIP Proxy in the same secure environment as the current hop, such as physically in the same hardware cabinet, then a secure SIPS connection would likewise not be required between the two hops.

Figure 4:
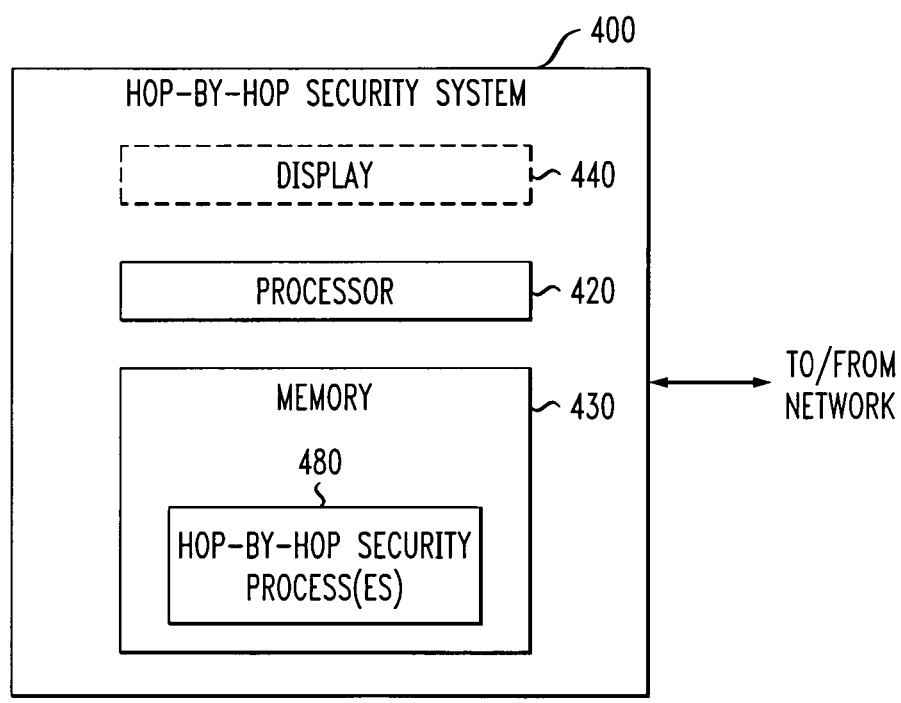
FIG. 4 is a block diagram of a system that can implement the present invention.

FIG. 4 is a block diagram of a hop-by-hop security system 400 that can implement the processes of the present invention. As shown in FIG. 4, memory 430 configures the processor 420 to implement the hop-by-hop security methods, steps, and functions discussed above in conjunction with FIG. 3 (collectively, shown as 480 in FIG. 4). The memory 30 could be distributed or local and the processor 420 could be distributed or singular. The memory 430 could be implemented as an electrical, magnetic or optical memory, or any combination of these or other types of storage devices. It should be noted that each distributed processor that makes up processor 420 generally contains its own addressable memory space. It should also be noted that some or all of computer system 400 can be incorporated into an application-specific or general-use integrated circuit.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method for securing an end-to-end path in a network, said end-to-end path including a plurality of hops, said method comprising the steps of:
   receiving a call setup request for a call, said call setup request containing a request for end-to-end protection;
   identifying a next hop in said end-to-end path;
   determining, in response to said received call setup request, if a vendor associated with said next hop in said end-to-end path has satisfied one or more predefined security criteria; and
   routing said call to said next hop if said vendor has satisfied said one or more predefined criteria.

2. The method of claim 1, wherein said determining step is performed by accessing a look-up table.

3. The method of claim 1, wherein said determining step determines if said vendor has previously indicated an adherence to said one or more predefined security criteria.

4. The method of claim 1, wherein said routing step is performed in accordance with a Secure SIP protocol.

5. The method of claim 1, wherein said routing step is only performed if said next hop has satisfied said one or more predefined criteria.

6. The method of claim 1, wherein said routing step further comprises the steps of routing said call and signaling an indication of a compromised security to a caller associated with said call if said next hop has not satisfied said one or more predefined criteria.

7. The method of claim 1, further comprising the step of dropping said call if said next hop has not satisfied said one or more predefined criteria.

8. The method of claim 2, wherein said look-up table lists one or more vendors that have achieved a predefined security rating.

9. The method of claim 2, wherein said look-up table identifies members in a predefined consortium or business group.

10. The method of claim 2, wherein said look-up table identifies signatories to a predefined contract or technical specification.

11. An apparatus for securing an end-to-end path in a network, said end-to-end path including a plurality of hops, the apparatus comprising:
    a memory; and
    at least one processor, coupled to the memory, operative to:
    receive a call setup request for a call, said call setup request containing a request for end-to-end protection;
    identify a next hop in said end-to-end path;
    determine, in response to said received call setup request, if a vendor associated with said next hop in said end-to-end path has satisfied one or more predefined security criteria; and
    route said call to said next hop if said vendor has satisfied said one or more predefined criteria.

12. The apparatus of claim 11, wherein said processor determines if said vendor has satisfied said one or more predefined security criteria by accessing a look-up table.

13. The apparatus of claim 11, wherein said processor determines if said vendor has satisfied said one or more predefined security criteria by determining if said vendor has previously indicated an adherence to said one or more predefined security criteria.

14. The apparatus of claim 11, wherein said routing is performed in accordance with a Secure SIP protocol.

15. The apparatus of claim 11, wherein said routing is only performed if said next hop has satisfied said one or more predefined criteria.

16. The apparatus of claim 11, wherein said processor is further configured to route said call and signal an indication of a compromised security to a caller associated with said call if said next hop has not satisfied said one or more predefined criteria.

17. The apparatus of claim 11, wherein said processor is further configured to drop said call if said next hop has not satisfied said one or more predefined criteria.

18. The apparatus of claim 12, wherein said look-up table identifies one or more of: (i) vendors that have achieved a predefined security rating; (ii) members in a predefined consortium or business group; and (iii) signatories to a predefined contract or technical specification.

19. An article of manufacture for securing an end-to-end path in a network, said end-to-end path including a plurality of hops, comprising a machine readable storage medium containing one or more programs which when executed implement the steps of:
    receiving a call setup request for a call, said call setup request containing a request for end-to-end protection;
    identifying a next hop in said end-to-end path;
    determining, in response to said received call setup request, if a vendor associated with said next hop in said end-to-end path has satisfied one or more predefined security criteria; and
    routing said call to said next hop if said vendor has satisfied said one or more predefined criteria.

20. The article of manufacture of claim 19, wherein said determining step further comprises the step of accessing a look-up table that identifies one or more of: (i) vendors that have achieved a predefined security rating; members in a predefined consortium or business group; and signatories to a predefined contract or technical specification.

* * * * *